United States Patent
Grieser et al.

[11] Patent Number: 5,906,453
[45] Date of Patent: May 25, 1999

[54] JOINT FORMING DEVICES

[75] Inventors: Jerry D. Grieser, Archbold; Richard A. Nelson, Napoleon; Steven R. Munday, Stryker, all of Ohio; William E.T. Vallance, Marlow, United Kingdom

[73] Assignee: Titus International PLC, Buckinghamshire, United Kingdom

[21] Appl. No.: 08/969,215

[22] Filed: Nov. 12, 1997

Related U.S. Application Data

[63] Continuation of application No. 08/655,768, May 30, 1996, abandoned.

[30] Foreign Application Priority Data

May 31, 1995 [GB] United Kingdom ................... 9510990

[51] Int. Cl.⁶ ....................................................... F16B 12/10
[52] U.S. Cl. ..................................... 403/409.1; 403/405.1
[58] Field of Search .......................... 403/405.1, 406.1, 403/407.1, 409.1

[56] References Cited

U.S. PATENT DOCUMENTS

| | | | |
|---|---|---|---|
| 4,332,495 | 6/1982 | Bürgers | 403/6 |
| 4,408,923 | 10/1983 | Kubler | 403/407.1 X |
| 4,518,278 | 5/1985 | Koch | 403/230 |
| 4,545,698 | 10/1985 | Koch | 403/231 |
| 4,756,637 | 7/1988 | Walz | 403/231 |
| 4,830,531 | 5/1989 | Condit et al. | 403/405.1 X |
| 4,883,383 | 11/1989 | Challis | 403/407.1 |
| 4,957,386 | 9/1990 | Harley et al. | 403/407.1 X |
| 5,143,473 | 9/1992 | Harley | 403/231 |

FOREIGN PATENT DOCUMENTS

| | | | |
|---|---|---|---|
| 1467282 | 12/1966 | France | 403/405.1 |
| 2546749 | 4/1977 | Germany. | |
| 794608 | 5/1958 | United Kingdom. | |
| 1009985 | 11/1965 | United Kingdom. | |
| 1174319 | 12/1969 | United Kingdom. | |
| 1571697 | 7/1980 | United Kingdom. | |
| 1573172 | 8/1980 | United Kingdom. | |
| 2040385 | 8/1980 | United Kingdom. | |
| 1582761 | 1/1981 | United Kingdom. | |
| 2074282 | 10/1981 | United Kingdom. | |
| 2119052 | 11/1983 | United Kingdom. | |
| 2119053 | 11/1983 | United Kingdom. | |
| 2172076 | 9/1986 | United Kingdom. | |
| 2241299 | 8/1991 | United Kingdom. | |
| 2246826 | 2/1992 | United Kingdom. | |
| 2277973 | 11/1994 | United Kingdom. | |
| 2285106 | 6/1995 | United Kingdom. | |

*Primary Examiner*—Anthony Knight
*Attorney, Agent, or Firm*—Emch, Schaffer, Schaub & Porcello Co., L.P.A.

[57] ABSTRACT

An elongate fastening element for a device for use in forming a joint between two members having at least one engaging surface cooperably engageable with a respective arcuate camming surface of a rotatable tightening element. In use, the fastening element is fitted to one of the joint members and the tightening element is fitted to the other joint member. Rotation of the tightening element about its axis of rotation causes axial movement of the fastening element towards that axis of rotation to cause a joint formed between the two members by means of the device to tighten. The or each engaging surface is provided on a leading end portion of the fastening element and has a profile configured such that engagement with the respective camming surface is at least a line contact occurring over substantially the entire length of the engaging surface.

17 Claims, 4 Drawing Sheets

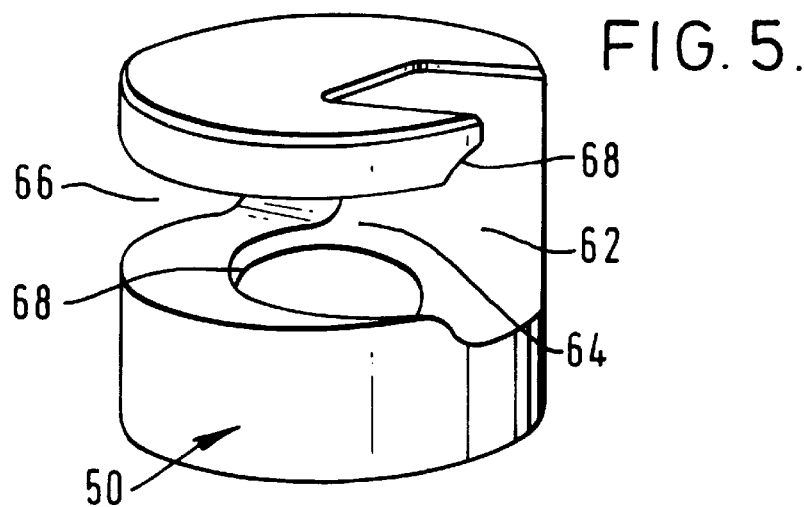
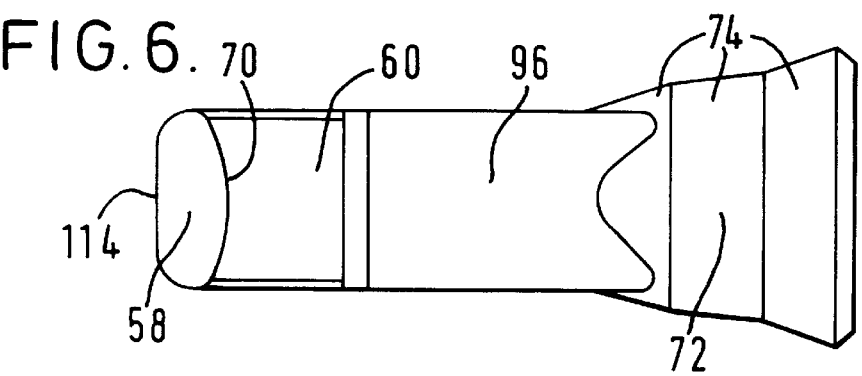
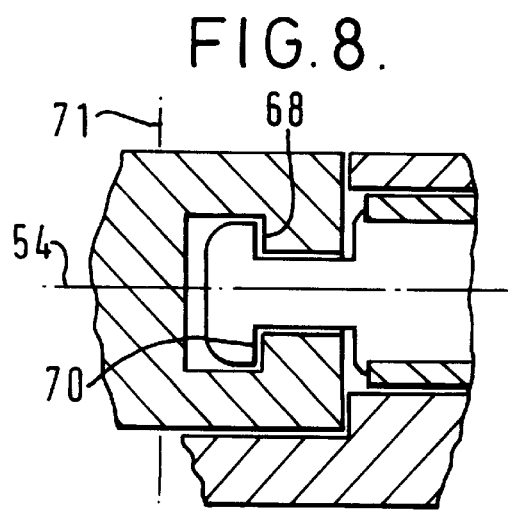
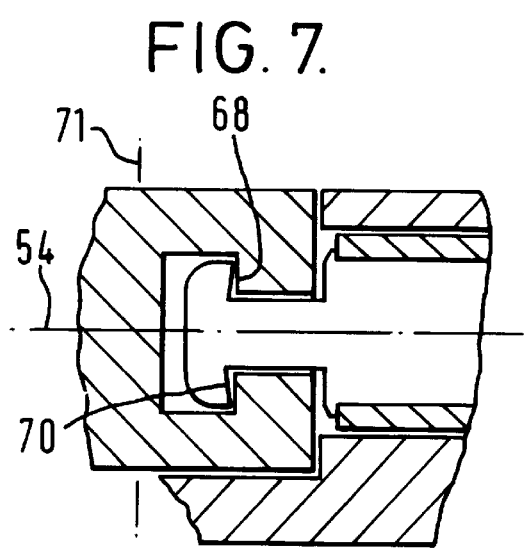

JOINT FORMING DEVICES

This application is a continuation of application Ser. No. 08/655,768 filed on May 30, 1996 now abandoned.

The invention relates generally to joint forming devices for use in forming a joint between two members in which a fastening element of the device is to be fitted to one said member and a tightening element of the device is to be fitted to the other said member, the tightening device having at least one camming surface operably engageable with parts of an engagement surface of the fastening element whereby rotation of the tightening element about an axis of rotation thereof causes axial movement of the fastening element in a direction towards that axis of rotation to cause a joint formed between the two members with the device to tighten. The invention also relates to fastening elements for such joint forming devices.

A known joint forming device for forming a joint between two panels of a piece of furniture is shown in FIGS. 1 and 2. The device comprises a generally cylindrical fastening element 10 and a tightening element 12.

The fastening element 10 is in the form of an elongate pin and has a ribbed or threaded end portion 14 by which it can be fixed to a panel. At the end opposite the threaded portion, the fastening element has a head portion 16 separated from the main body of the fastening element by a neck 18. The underside of the head portion 16 and portions of the neck 18 adjacent thereto define an engagement surface which extends circumferentially about the longitudinal axis of the fastening element. In directions transverse the longitudinal axis of the fastening element the engagement surface extends radially and axially outwardly with respect to that longitudinal axis.

The tightening element comprises a rotatable drum provided with two arcuate camming surfaces 20 which are defined on respective sides of a slot which extends partially around the circumference of the drum. In a direction transverse the arcuate length thereof, the arcuate camming surfaces 20 extend axially inwardly and radially outwardly with respect to the axis of rotation 22 of the tightening element. An open end of the slot (not shown) is adapted to allow a head portion 16 of the fastening element to be inserted into a cavity 24 defined in a central region of the drum.

In use, to form and secure a joint between two panels 26, 28, the fastening element is screwed into one 26 of the panels. The tightening element 12 is inserted into a bore 30 in the other panel 28 such that its axis of rotation 22 is substantially perpendicular to the longitudinal axis of the fastening element 10. With the head portion 16 of the fastening element received in the cavity 24, rotation of the tightening element 12 causes the fastening element to be drawn inwardly of the drum by action of the camming surfaces on a circumferential engagement surface formed on the underside of the head portion 16 thereby drawing and securing the panels 26, 28 together.

A problem with the known joint forming device is that the reduction of the cross-sectional area of the fastening element at the neck 18 reduces the tensile loading which the element can withstand. It will be appreciated that the extent of this reduction of the section of the fastening element is more critical when the element is to be made of a material which has a relatively low tensile strength, which is the case for many plastics materials.

It will also be understood that in the case of the known joint forming device, it is necessary that the engagement surface of the fastening element 10 extends circumferentially thereof since it is not possible in fitting the element 10 to the panel 26 to reliably orientate the element 10 with respect to the camming surfaces 20.

A further problem with the known joint forming device is that the configuration of the engagement surface and camming surfaces is such that as the joint between the two panels is tightened by rotation of the tightening element, engaged parts of the engagement surface of the fastening element act as a wedge forcing the camming surfaces 20 apart. That is, the forces generated in the elements 10, 12 can cause the camming surfaces 20 to splay apart reducing the overlap of the arcuate camming surfaces and the engaged parts of the engagement surface thereby preventing the joint from being securely made. Thus, rotation of the drum beyond a limit which is defined by the geometry of the elements 10, 12 and the materials from which the parts are made can cause loosening rather than tightening of the joint. This problem is particularly noticeable if the tightening element is made of a softer material than the fastening element; for example, if the fastening element is made of a die casting alloy and the tightening element is made of a plastics material.

Referring to FIG. 2, it will also be appreciated that the contact area between the camming surfaces and the engagement surface is comparatively small. In practice contact between the camming surfaces and respective engaged parts of the engagement surface is comprised of substantially line contacts in the above-mentioned transverse direction as indicated by the lines 32 in FIG. 1. In order to provide clearances necessary to allow relative movement between the two elements 10, 12, the geometry of the camming surfaces and the head portion may be such that there is little more than point contact between the respective camming and engaged parts of the engagement surface. It will be understood that in use, the stress concentration at these line or point contacts can be relatively high and this in combination with the above-described wedging effect increases the likelihood that the joint will not be tightly formed.

It is an object of the invention to at least partially overcome at least one of the above-described problems.

Accordingly, the invention provides an elongate fastening element for a device for use in forming a joint between two members, the fastening element having at least one engaging surface cooperably engageable with a respective arcuate camming surface of a tightening element of the joint forming device whereby rotation of said tightening element about an axis of rotation thereof causes axial movement of said fastening element in a direction towards said axis of rotation to cause a joint formed between said two members with said device to tighten, the or each said engaging surface being provided on a leading end portion of the fastening element which has a generally rectangular transverse cross-section and having a length extending transversely of a longitudinal axis of the fastening element.

The or each engaging surface may be defined by a wall of a respective slot extending transversely of the longitudinal axis of the fastening element.

Preferably, the fastening element comprises two said engaging surfaces defined by respective oppositely disposed slots defined in said leading end portion, said slots defining a neck portion of the fastening element which neck portion has a substantially rectangular cross-section.

Advantageously, in a direction transverse the length thereof, the or each engaging surface is substantially perpendicular with respect to the longitudinal axis of the fastening element.

The fastening element may further comprise orientation indicating means whereby, in use, the or each engaging surface can be oriented with said leading end portion inserted into a bore in a said joint member and/or a hollow central region of a said tightening element.

The fastening element may comprise a generally cylindrical trailing end portion comprising at least one circumferentially extending taper portion.

The fastening element may comprise a body portion interconnecting said leading and trailing end portions, said body portion having a generally rectangular transverse cross-section.

A device for use in forming a joint between two members comprising a fastening element as defined in any of the last seven preceding paragraphs and a tightening element having a respective camming surface for cooperable engagement with the or each engaging surface of the fastening element may further comprise a bush having a through-bore adapted to partially receive the fastening element, said through-bore comprising a respective taper portion for mating with the or each taper portion of the fastening element.

The invention also includes a device for use in forming a joint between two members, the device comprising a tightening element to be fitted to one of said members and an elongate fastening element having a longitudinal axis to be fitted to the other of said members, said tightening element having at least one arcuate camming surface cooperably engageable with a respective engaging surface of said fastening element whereby rotation of said tightening element about an axis of rotation thereof causes axial movement of said fastening element in a direction towards said axis of rotation to cause a joint formed between said two members with said device to tighten, the or each said engaging surface having a length extending transversely of said axes from one side of the element to the opposite side thereof and being adapted such that said cooperable engagement with the respective arcuate camming surface in the direction of the length of the arcuate camming surface occurs substantially over said length of the engaging surface.

Preferably, said cooperable engagement with the respective camming surface occurs over at least a substantial area of the engaging surface.

In a direction transverse the length thereof, the or each camming surface may extend axially inwardly and radially inwardly with respect to said axis of rotation of the tightening element.

The or each camming surface may extend at an angle of substantially three degrees to said axis of rotation of the tightening element.

In a direction transverse said length thereof the or each engaging surface may extend radially outwardly and axially inwardly with respect to the longitudinal axis of the fastening element.

The or each engaging surface may extend at an angle of substantially eighty seven degrees to said longitudinal axis of the fastening element.

The invention also includes a device for use in forming a joint between two members, the device comprising a tightening element to be fitted to one of said members, a mounting means for said tightening element and an elongate fastening element having a longitudinal axis to be fitted to the other of said members, said tightening element having a radially inwardly facing arcuate camming surface cooperably engageable with an engaging surface of said fastening element whereby rotation of said tightening element about an axis of rotation thereof causes axial movement of said fastening element in a direction towards said axis of rotation to cause a joint formed between said two members with said device to tighten, wherein said camming surface extends axially or axially outwardly and radially outwardly with respect to said axis of rotation of the tightening element towards a free edge and said mounting means is adapted to rotatably mount said tightening element such that, in use, said axis of rotation is inclined with respect to the longitudinal axis of the fastening element whereby said cooperable engagement is such that in use during such tightening there is substantially no reduction of an overlap of the arcuate camming surface and the engaging surface in a direction transverse the length of the arcuate camming surface.

Preferably, the or each camming surface and the respective engaging surface are cooperable such that in use during said tightening said transverse overlap tends to increase.

The axis of rotation of the tightening element may be inclined with respect to said longitudinal axis of the fastening element such that in the region of said overlap and in said transverse direction of the camming surface, the camming surface is perpendicular to said longitudinal axis of said fastening element.

The axis of rotation of the tightening element may be inclined with respect to said longitudinal axis of the fastening element such that in the region of said overlap and in said transverse direction of the camming surface, the camming surface is inclined with respect to said longitudinal axis of the fastening element.

In such an embodiment, the camming surface may extend at an angle of substantially seven degrees to said axis of rotation with said mounting means being adapted to rotatably mount the tightening element such that said axis of rotation is at an angle of substantially eighty degrees to said longitudinal axis of the fastening element whereby in said transverse direction, a portion of the camming surface engaged by the engaging surface extends in the general direction of a leading end of the fastening element at an angle of substantially eighty seven degrees to said longitudinal axis.

In the direction of said transverse overlap, the engaging surface of the fastening element may be inclined with respect to the longitudinal axis of the fastening element and extend to an axially innermost edge in a direction away from a leading end of the fastening element.

The engaging surface may extend at an angle of substantially eighty seven degrees to said longitudinal axis.

The or each engaging surface may have a length extending transversely of the longitudinal axis and in the direction of said overlap and be adapted such that engagement with the respective arcuate camming surface in the direction of the length of the arcuate camming surface occurs substantially over said length of the engaging surface.

The engagement with the respective camming surface may occur over at least a substantial area of the engaging surface.

The or each engaging surface may be defined on a portion of said fastening element which has a generally rectangular transverse cross-section.

The or each engaging surface may be defined by a wall of a respective slot extending transversely of the longitudinal axis of the fastening element.

The fastening element may comprise orientation indicating means whereby, in use, the or each engaging surface can be oriented so as to be engageable with the respective camming surface on insertion into a hollow central region of the tightening element.

In order that the invention may be well understood, some embodiments thereof, which are given by way of example only, will now be described with reference to the accompanying drawings in which:

FIG. 5 is a perspective view of the tightening element of the first embodiment;

FIG. 6 is a plan view of the fastening element of the first embodiment;

FIG. 7 is a view similar to FIG. 4 showing a modified version of the first embodiment;

FIG. 8 is a view similar to FIG. 4 showing another modified version of the first embodiment;

Figure 9:
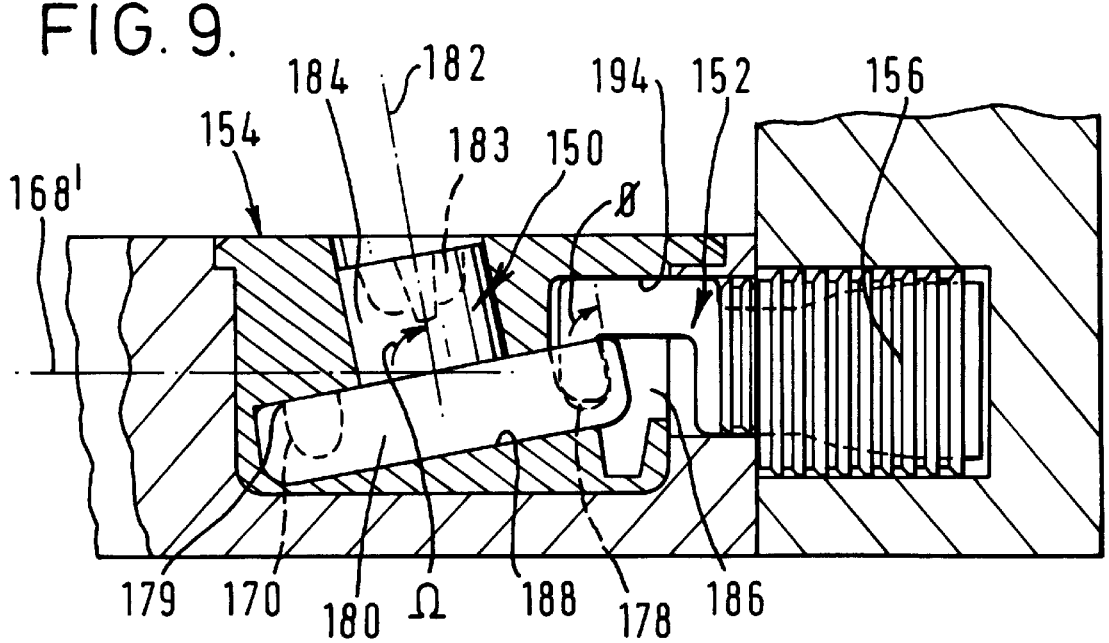
Figure 10:
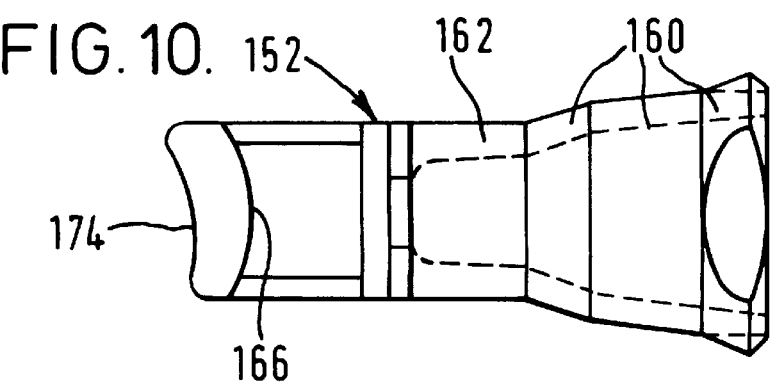
Figure 11:
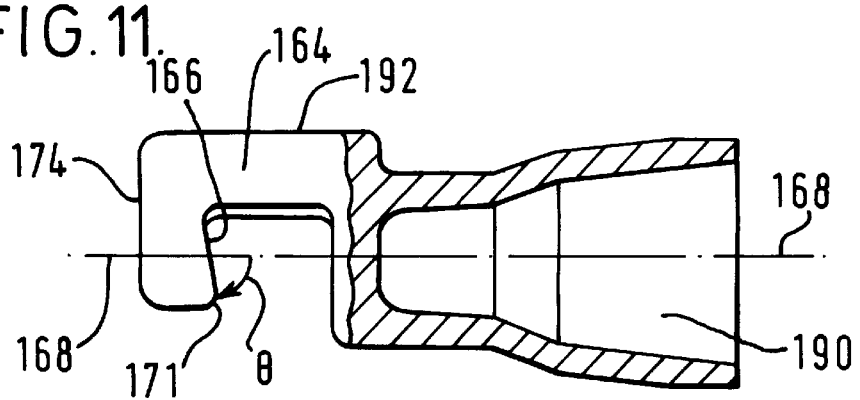

FIG. 9 a side section view of a second embodiment of a joint forming device according to the invention in use;

FIG. 10 is a plan view of the fastening element viewed from below in FIG. 9; and FIG. 11 is a partial side sectional view of the fastening element.

Referring to FIGS. 3 to 6, there is shown a joint forming device comprising a tightening element 50 and an elongate fastening element 52 having a longitudinal axis 54.

A leading end portion of the fastening element comprises a head portion 58 and a neck portion 60. The neck portion 60 is defined by opposed slots extending transversely of the longitudinal axis 54 of the fastening element. The leading end portion is generally rectangular in cross-section and is preferably substantially square.

Figure 3:
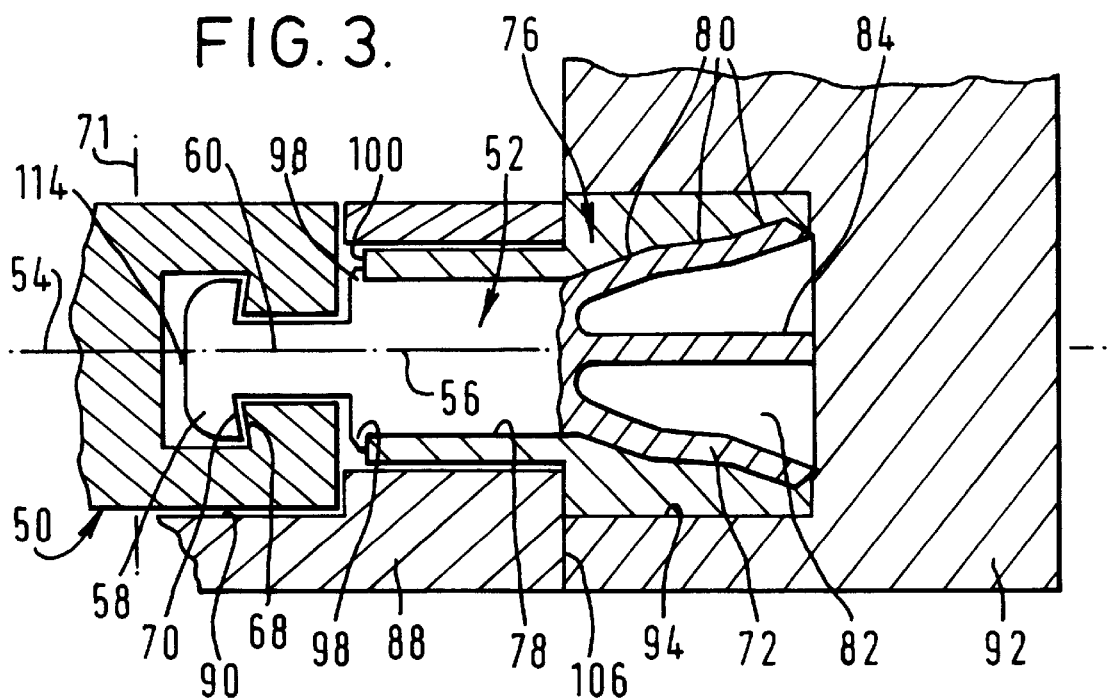
FIG. 3 is a side section view of a first embodiment of a joint forming device according to the invention in use.
Figure 4:
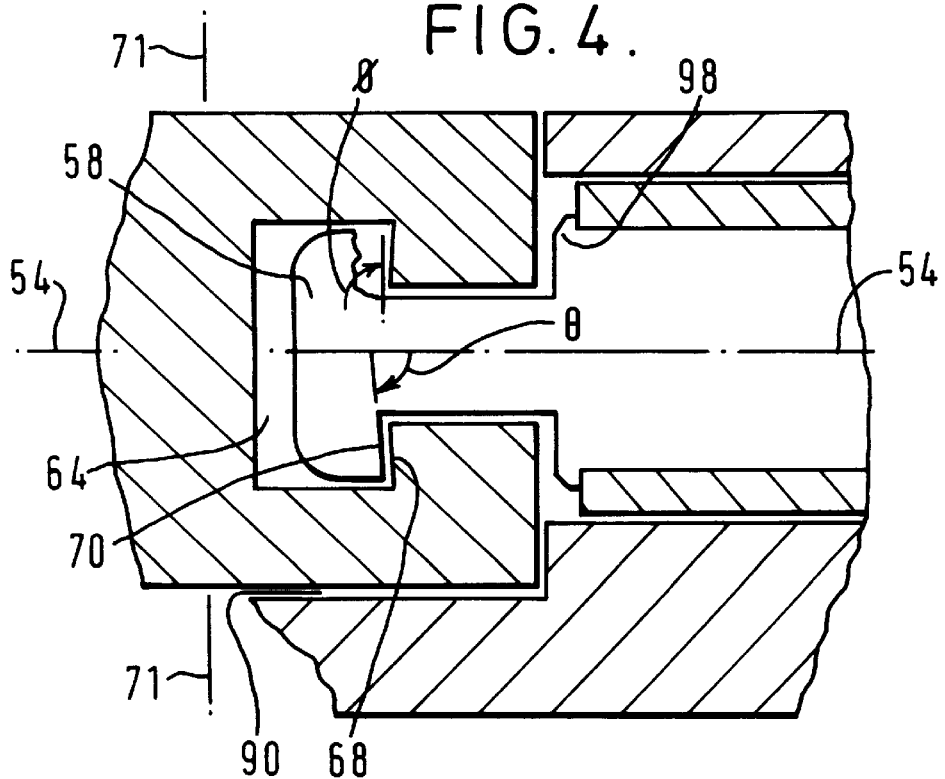
FIG. 4 is an enlargement of a portion of FIG. 3.

As best seen in FIG. 5, the tightening element 50 comprises a drum-like element having an opening 62 through which the head portion 58 can be inserted into a hollow central region 64 of the tightening element. A slot 66 extends from the opening 62 partially circumferentially of the tightening element and is adapted to receive the neck portion 60 as shown in FIGS. 3 and 4.

The tightening element further comprises two arcuate camming surfaces 68 adapted to cooperably engage respective discrete engaging surfaces 70 of the fastening element whereby rotation of the tightening element causes axial movement of the fastening element in the direction of the axis of rotation 71 of the tightening element.

An end portion 72 of the fastening element opposite the leading end portion 56 is generally circular in cross-section and comprises a plurality of taper portions 74. In use, the fastening element is partially received in a bush 76 having a through-bore 78 which is provided with a plurality of taper portions 80 for mating with the taper portions 74.

The end portion 72 comprises a cavity 82. A rib 84 is provided in the cavity for strengthening the end portion 72 and can be used for aligning the fastening element during assembly of the joint forming device as will be described in more detail below.

In use, to form and tighten a joint between two panels, the tightening element is fitted to one panel 88 by insertion in a bore 90 and the fastening element, partially housed in the bush 76, is fitted to the other panel 92 by insertion in a bore 94.

In more detail, the fastening element is inserted into the bush 76, head portion 58 first. A body portion 96 connects the neck portion 60 with the end 72 of the fastening element and is provided with projections 98 which engage a leading end 100 of the bush 76 to retain the fastening element in its inserted position in the bush. The tightening element is inserted in the bore 90 with the opening 62 directed towards a bore 104 which extends between the bore 90 and an edge 106 of the panel 88. The leading end 100 of the bush is inserted into the bore 104 so that the head portion 58 of the fastening element is received in the hollow central region 64 of the tightening element. The tightening element can then be rotated to bring the camming surfaces 68 into engagement with the respective engaging surfaces 70.

It will be appreciated that in order to allow this rotation of the tightening element, the fastening element must be correctly oriented relative to the tightening element so that the neck portion 60 can pass through the slot 66. The rib 84 is arranged to extend transversely of the longitudinal axis of fastening element in the same direction as the opposed slots which define the neck portion 60. Thus, an assembler can ascertain the orientation of the neck portion as the bush is inserted into the bore 104 by viewing the orientation of the rib 84.

With the head portion 58 correctly received in the tightening element 50, the fastening element is fitted to the panel 92 by inserting the end portion 72, housed in the bush 76, into the bore 94. The joint between the panels 88, 92 can then be tightened by rotation of the tightening element which causes axial movement of the fastening element 52 which is drawn towards the axis of rotation 71 of the tightening element. This movement pulls the taper portions 74 inwardly of the bush against the mating taper portions 80 and causes an expansion of the portion of the bush disposed in the bore 94 against the wall of the bore. The bush is preferably provided with external barbs or ribs (not shown) for gripping walls of the bores 94, 104. For further general details on the forming and securing a joint with the joint forming device, reference should be made to the applicant's United Kingdom patent applications GB 9309910.9 and GB 9326352.3 which both disclose joint forming devices in which a tightening element operates on an elongate fastening element to secure a joint between two panels by expanding a bush housed in a bore in one of the panels.

As shown in FIG. 6, the engaging surfaces 70 are each defined by a wall defining a respective one of the slots which define the neck portion 60 and have a length extending transversely of the longitudinal axis of the fastening element. The engaging surfaces 70 are each curved along said length and that curvature is adapted to match the curvature of the respective arcuate camming surfaces 68; that is, the curve of the camming surfaces in the arcuate direction thereof. It will be appreciated that by curving the engaging surfaces in the lengthwise direction thereof to substantially match the curvature of the camming surfaces, engagement between the respective surfaces in the direction of the length of the arcuate camming surface occurs substantially over the length of the engaging surfaces.

As shown in FIG. 3, the arcuate camming surfaces 68, in a direction transverse the length thereof extend axially inwardly and radially inwardly with respect to the axis of rotation 71 of the fastening element. The engaging surfaces 70, in a direction transverse the longitudinal axis 54 of the fastening element extend radially outwardly and axially inwardly with respect to the longitudinal axis 54. In effect, both the engaging surfaces and the camming surfaces are undercut in transverse directions thereof.

It will be understood that the complimentary undercutting of the surfaces 68, 70 is such that engagement between the respective surfaces 68, 70 occurs over at least a substantial area of the engaging surfaces. Accordingly stresses on engaged portions of the camming surfaces will, for a given load, be lower than for the prior art joint forming device shown in FIGS. 1 and 2.

Figure 1:
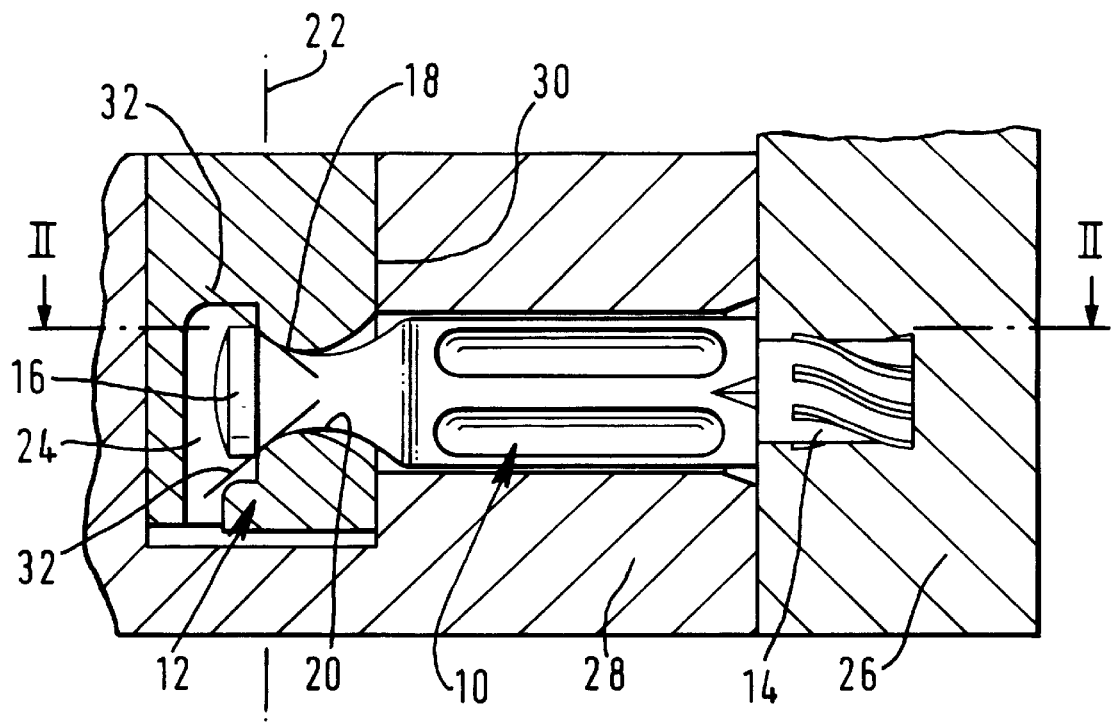
FIG. 1 is a side sectional view of a known joint forming device in use.
Figure 2:
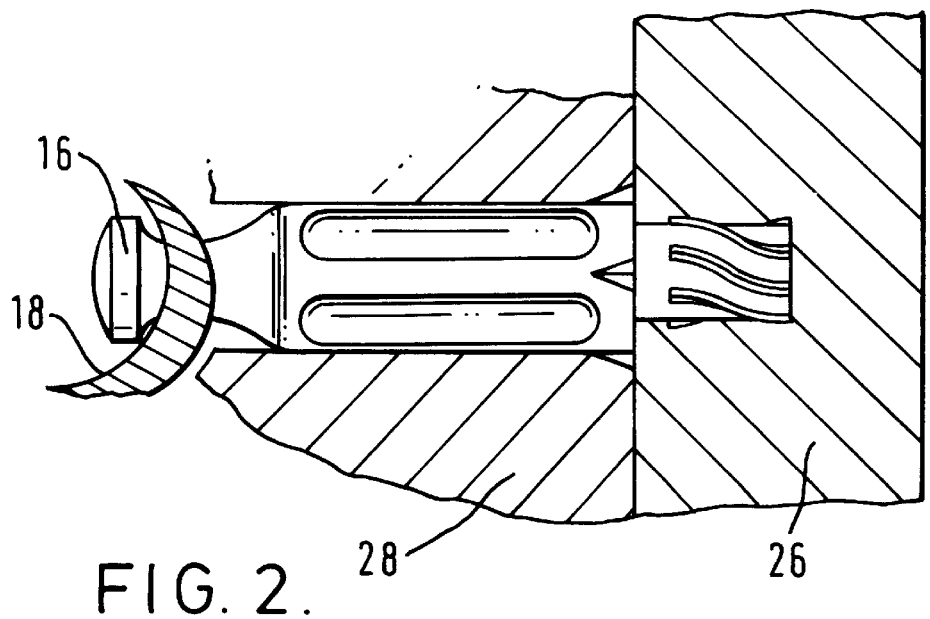
FIG. 2 is a section view on line II—II in FIG. 1.

A further advantage of the undercutting of the surfaces 68, 70 is that as the joint is tightened, the forces generated in use of the device resist separation of the camming surfaces 68 and can act to draw the surfaces 68 together in the general direction of the longitudinal axis 54 of the fastening element. As previously described when the prior art joint forming device shown in FIGS. 1 and 2 is loaded for tightening a joint, the amount of overlap between the camming surfaces and the respective engaged parts of the engaging surface in a direction transverse the length of the camming surfaces tends to be reduced as the camming surfaces separate. In the joint forming device of the embodiment, the camming surfaces and respective engaging surfaces are adapted such that there is no reduction of the transverse overlap and this can increase under load. In the case where the transverse overlap increases under load it will be appreciated that a progressive clamping force is applied to the fastening element which will increase the security of the joint.

In the embodiment, the camming surfaces 68 are disposed at an angle ⌀ of substantially three degrees with respect to the axis of rotation 71 and the engaging surfaces 70 are disposed at in angle θ of substantially eighty seven degrees with respect to the longitudinal axis 54. It will be appreciated that for some applications it will be undesirable for the clamping action to be too severe since this may result in the slot 66 closing about the neck portion 60 thereby preventing further rotation of the tightening element before the two panels have been drawn tightly together resulting in a gapped joint. It is also preferable that the clamping action does not cause excessive permanent deformation of the tightening element if the securing device is to be reusable. The skilled person will readily be able to determine a suitable arrangement of the respective surfaces 68, 70 taking into account the application intended and the materials from which the elements 50, 52 are to be made in order to provide a required degree of clamping.

It has been found that satisfactory results can be obtained when the surfaces 68, 70 do not mate over a substantial area of the engaging surface. In a modified version of the first embodiment shown in FIG. 7, the engaging surfaces 70 are arranged in the same way as is illustrated in FIGS. 3 and 4. That is the surfaces 70 extend radially outwardly and axially inwardly with respect to the longitudinal axis 54 and are disposed at an angle of substantially three degrees to the axis 54. The arcuate camming surfaces 68 are arranged such that in transverse directions thereof, they extend axially, that is parallel, with respect to the axis of rotation 71 and, therefore, in use are substantially perpendicular to the longitudinal axis 54. The matching curvature of the surfaces 68, 70 previously described is such that substantially a line contact occurs substantially over the length of the engaging surfaces. It will be appreciated that in use, as the loading on the device becomes sufficient to deform the surfaces 68 and/or 70 the deformation will provide an extended transverse overlap therebetween thereby increasing the engaged area and reducing stresses in the parts. It has been found that where the fastening element 52 is made of a die casting alloy and the tightening element is made of a plastics material, the engaging surfaces 70 will dig into the camming surfaces along the line of contact pulling the camming surfaces in the general direction of the longitudinal axis of fastening element thereby increasing the transverse overlap of the surfaces 68, 70 and providing a clamping action on the fastening element.

It will be understood that engagement over a substantial area of the engaging surface can be obtained in an arrangement in which the respective surfaces 68, 70 are not inclined as shown in FIG. 3. Thus, in another modified version of the first embodiment, shown in FIG. 8, in the direction transverse the length thereof, the engaging surfaces 70 are perpendicular to the direction of the longitudinal axis of the fastening element. In the direction transverse their arcuate length, the camming surfaces 70 extend axially, that is parallel, with respect to the axis of rotation 71. Since the axis of rotation 71 and longitudinal axis 54 are substantially mutually perpendicular, in the camming surfaces 68, in the transverse direction thereof extend substantially parallel to the engaging surfaces 70. Accordingly, engagement occurs over a substantial area of the engaging surfaces. It will be understood that under load, substantially full face engagement of the surfaces 70 with the camming surfaces 68 together with the absence of a wedging effect substantially prevents a reduction the transverse overlap of the surfaces 68, 70.

A second embodiment of a joint forming device will now be described with reference to FIGS. 9 to 11. The device comprises a tightening element 150 and an elongate fastening element 152. The device further comprises mounting means 154 in which the tightening element 150 is rotatably mounted. A bush 156 in which the fastening element is partially housed and a cylindrical end portion 158 of the fastening element which portion comprises taper portions 160 generally correspond to like parts of the first embodiment and accordingly will not be described in any detail here.

A hook-like leading end portion 162 of the fastening element has a generally rectangular cross-section and is connected with the end portion 156 by a central body portion 164. The hook portion comprises a wall which defines an engaging surface 166 of the fastening element. The engaging surface has a length extending transversely of the longitudinal axis 168 of the fastening element and is curved along that length to match the curvature, in the arcuate direction thereof, of a camming surface 170 of the tightening element. Accordingly, as with the respective surfaces of the previous embodiment, in use, engagement between the camming surface 170 and the engaging surface 166 occurs substantially over the length of the engaging surface.

As best seen in FIG. 11, in transverse directions thereof, the engaging surface 166 is inclined relative to the longitudinal axis of the fastening element and extends to an axially innermost edge 171 in a direction away from a leading end 174 of the fastening element. Thus as with the previous embodiment the engaging surface is in effect undercut in transverse directions thereof. In the embodiment, the engaging surface 166 is at an angle θ of substantially eighty seven degrees to the longitudinal axis of the fastening element.

The tightening element 150 is generally T-shaped and has an eccentric partially circumferentially extending groove 178 defined in a base portion 180 thereof. The camming surface 170 is defined by a radially outermost wall of the groove 178. In transverse directions thereof the camming surface 170 extends to a free edge 179. The direction of said extension to the free edge 179 is axially outwardly and radially outwardly with respect to the axis of rotation 182 of the tightening element at an angle of seven degrees. The tightening element is provided with aperture means 183 in an upper portion 184 thereof so as to be rotatable by means of a screw driver or hexagonal wrench in the usual way.

The mounting means comprises a split sleeve 154 which can be snap-fitted around the tightening element and is provided with an opening 186 through which the hook-like portion 162 can be inserted in order to bring the engaging surface 166 into engagement with the camming surface 170. The sleeve defines respective inclined recesses for receiving the base and upper portions 180, 184 of the tightening element. When installed in the sleeve 154 with the base portion 180 supported on an inclined wall 188 of the recess therefor, the tightening element is disposed with its axis of rotation inclined at an angle Ω to a horizontal axis 168' with which the longitudinal axis 168 is aligned when the engaging surface 168 engages the camming surface 170 in use of the device. In the embodiment, the recesses are adapted such that the tightening element is supported with the axis of rotation 182 at an angle Ω of eighty degrees to the horizontal axis 168'. It will be appreciated that this inclination of the tightening element causes portions of the camming surface engaging the engaging surface 166 to be inclined at an angle Ø with respect to the axes 168, 168' which is complementary to the angle of inclination of the engaging surface 166; i.e. at an angle Ø of substantially eighty seven degrees. Thus, in effect, portions of the camming surface cooperably engaging the engaging surface 166 are undercut in transverse directions thereof. Accordingly, in use, engagement between the camming surface 170 and engaging surface 166 occurs over at least a substantial area of the engaging surface.

As with the first described embodiment, the complementary inclination of the surfaces 168, 170 in transverse directions thereof provides the advantage that forces generated in the joint forming device in use, prevent a reduction of the overlap of the surfaces 166, 170 and insofar as the respective clearances provided allow, this overlap can be increased as the loading on the device is increased.

The installation of the second embodiment of the joint forming device in the respective panels and the forming and tightening of a joint therebetween is carried out in the same way as the previously described embodiment, except that it is the sleeve 154 which is fitted to a bore of one of the panels, the tightening element being rotatably mounted within the sleeve prior to that fitting. As with the previous embodiment, a rib (not shown) can be provided in a cavity 190 of the fastening element by means of which an assembler can readily orientate the fastening element during assembly of the device. Additionally, or alternatively use can be made of a flat upper surface 192 of the fastening element engaging with a mating surface 194 of the sleeve during insertion of a leading end 174 of the fastening element into the sleeve through the opening 186.

It will be understood that the second embodiment has certain advantages over the first embodiment as regards manufacture of the tightening element when the camming device is to be provided with a camming surface or surfaces which is/are undercut in transverse directions thereof. The skilled person will appreciate that it is difficult to mould or cast a tightening element with an undercut camming surface as shown in the first embodiment. However, the inclination of the wall of the groove 178 which defines the camming surface 170 can readily be provided in a moulding or casting since it is in the direction in which a draft angle would usually be provided in a moulding or casting process, the undercut of the camming surface being provided by the inclined mounting of the tightening element within the sleeve 154.

It will be appreciated that in the second embodiment the camming surface 170 could extend axially with respect to the axis of rotation 182.

It has been found that in order to obtain a smooth tightening and release action, the lengthwise curvature of the engaging surfaces 70, 166 should be such that the outer ends of the surfaces 70, 166 do not contact the respective camming surfaces. A small clearance provided between the surfaces 68, 70 and 166, 170 at the outer ends of the engaging surfaces avoids the problem of the engaging surface ends digging into the camming surfaces during rotation of the tightening element, without significantly reducing the extent of the contact between the engaging and camming surfaces.

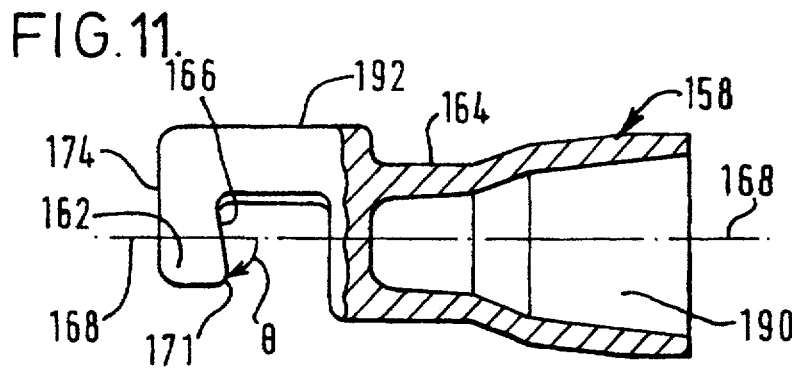

We claim:

1. A device for use in forming a joint between a first joint member and a second joint member, the device comprising a tightening element, a mounting means to be fitted to said first joint member for mounting said tightening element to said first joint member and an elongate fastening element having a longitudinal axis to be fitted to the second said joint member, said tightening element having an arcuate camming surface facing radially inwardly towards an axis of rotation of the tightening element and cooperably engageable with an engaging surface of said fastening element whereby rotation of said tightening element in one direction about an axis of rotation thereof causes said fastening element to be pulled axially in a direction towards said axis of rotation to cause a joint formed between said first and second joint members with said device to tighten, wherein said camming surface extends (i) axially outwardly or (ii) axially outwardly and radially outwardly with respect to said axis of rotation of the tightening element towards a free edge and said mounting means is adapted to rotatably mount said tightening element such that, in use, said axis of rotation is inclined with respect to the longitudinal axis of the fastening element such that in the region of engagement of the arcuate camming surface and said engaging surface and in a direction transverse the length of the camming surface, the camming surface is oriented to provide an undercut whereby said cooperable engagement is such that in use during such tightening there is substantially no reduction of the extent of said engagement.

2. A device as claimed in claim 1, wherein said camming surface extends at an angle of substantially seven degrees to said axis of rotation and when mounted by said mounting means said axis of rotation is at an angle of substantially eighty degrees to said longitudinal axis of the fastening element whereby in said transverse direction, a portion of the camming surface engaged by the engaging surface extends in the general direction of a leading end of the fastening element at an angle of substantially eighty seven degrees to said longitudinal axis.

3. A device for use in forming a joint between a first joint member and a second joint member, the device comprising a tightening element, a mounting means to be fitted to said first joint member for mounting said tightening element to said first joint member and an elongate fastening element having a longitudinal axis to be fitted to the second said joint member, sad tightening element having an arcuate camming surface facing radially inwardly towards an axis of rotation of the tightening element and cooperably engageable with an engaging surface of said fastening element whereby rotation of said tightening element in one direction about an axis of rotation thereof causes said fastening element to be pulled axially in a direction towards said axis of rotation to cause a joint formed between said two members with said device to tighten, wherein said camming surface extends axially outwardly and radially outwardly with respect to said axis of rotation of the tightening element towards a free edge and said mounting means is adapted to rotatably mount said tightening element such that, in use, said axis of rotation of the tightening element is inclined with respect to said longitudinal axis of the fastening element such that in the region of an overlap of the arcuate camming surface and the engaging surface in a direction transverse the arcuate length of the camming surface, the camming surface is perpendicular to said longitudinal axis of said fastening element whereby said cooperable engagement is such that in use during such tightening there is substantially no reduction of said overlap.

4. A device as claimed in claim 3, wherein in the direction of said transverse overlap the engaging surface of the fastening element is inclined with respect to the longitudinal axis of the fastening element and extends to an axially innermost and radially outermost edge in a direction away from a leading end of the fastening element.

5. A device as claimed in claim 4, wherein said engaging surface extends at an angle of substantially eighty seven degrees to said longitudinal axis.

6. A device as claimed in claim 3, wherein the or each engaging surface has a length extending transversely of the longitudinal axis and the direction of said overlap and is adapted such that engagement with the respective arcuate camming surface in the direction of the length of the arcuate camming surface occurs substantially over said length of the engaging surface.

7. A device as claimed in claim 6, wherein said engagement with the respective camming surface occurs over at least a substantial area of the engaging surface.

8. A device as claimed in claim 3, wherein the or each engaging surface is defined on a portion of said fastening element which has a generally rectangular transverse cross-section.

9. A device as claimed in claim 3, wherein the or each, engaging surface is defined by a wall of a respective slot extending transversely of the longitudinal axis of the fastening element.

10. A device as claimed in claim 3, wherein said fastening element comprises orientation indicating means whereby, in use, the or each engaging surface can be oriented so as to be engageable with the respective camming surface on insertion into a hollow central region of the tightening element.

11. A device as claimed in claim 3, wherein said tightening element defines a groove having a radially outermost wall which wall defines said camming surface.

12. A device as claimed in claim 11, wherein said tightening element comprises a base portion and an upper portion disposed on said base portion such that said base portion defines a shoulder which extends transversely of said axis of rotation, said groove being defined in said base portion such that said free edge is defined by said shoulder.

13. A device as claimed in claim 12, wherein said tightening element is generally T-shaped.

14. A device as claimed in claim 11, wherein in a lengthwise direction thereof said groove extends partially circumferentially of said tightening element.

15. A device as claimed in claim 3, further comprising a bush having a through-bore adapted to partially receive the fastening element, wherein said fastening element comprises a generally cylindrical trailing end portion comprising at least one circumferentially extending taper portion and said through-bore comprises a respective taper portion for mating with the or each said taper portion of the fastening element.

16. A device as claimed in claim 3, further comprising a bush having a through-bore adapted to partially receive the fastening element, wherein said fastening element comprises a generally cylindrical trailing end portion comprising at least one circumferentially extending taper portion and said through-bore comprises a respective taper portion for mating with the or each said taper portion of the fastening element.

17. A device for use in forming a joint between two members, the device comprising a tightening element to be fixed to one of said members and an elongate fastening element having a longitudinal axis to be fitted to the other of said members, said tightening element having at least one undercut camming surface which curves continuously in the lengthwise direction thereof and is cooperably engageable with a respective engaging surface of said fastening element that is complementary to said camming surface whereby rotation of said tightening element about an axis of rotation thereof causes axial movement of said fastening element in a direction towards said axis of rotation to cause a joint formed between said two members with said device to tighten, the or each said engaging surface having a length extending transversely of said axis from one side of said fastening element to an opposite side thereof, the arrangement being such that said cooperable engagement with the respective camming surface in the direction of the length of the camming surface is at least a line contact occurring over substantially the entire said length of the engaging surface.

* * * * *

UNITED STATES PATENT AND TRADEMARK OFFICE
CERTIFICATE OF CORRECTION

PATENT NO.   : 5,906,453
DATED        : May 25, 1999
INVENTOR(S)  : Jerry D. Grieser et al.

It is certified that error appears in the above-indentified patent and that said Letters Patent is hereby corrected as shown below:

The title showing an illustrative figure, should be deleted and substitute therefor the attached title page.

Col. 10, line 51, delete "sad" and insert --said--.

Signed and Sealed this

Twenty-third Day of November, 1999

Attest:

Q. TODD DICKINSON

*Attesting Officer*    *Acting Commissioner of Patents and Trademarks*

United States Patent [19]

Grieser et al.

[11] Patent Number: 5,906,453
[45] Date of Patent: May 25, 1999

[54] JOINT FORMING DEVICES

[75] Inventors: Jerry D. Grieser, Archbold; Richard A. Nelson, Napoleon; Steven R. Munday, Stryker, all of Ohio; William E.T. Vallance, Marlow, United Kingdom

[73] Assignee: Titus International PLC, Buckinghamshire, United Kingdom

[21] Appl. No.: 08/969,215

[22] Filed: Nov. 12, 1997

Related U.S. Application Data

[63] Continuation of application No. 08/655,768, May 30, 1996, abandoned.

[30] Foreign Application Priority Data

May 31, 1995 [GB] United Kingdom ............... 9510990

[51] Int. Cl.⁶ .................................................. F16B 12/10
[52] U.S. Cl. ................................ 403/409.1; 403/405.1
[58] Field of Search ........................... 403/405.1, 406.1, 403/407.1, 409.1

[56] References Cited

U.S. PATENT DOCUMENTS

| | | | |
|---|---|---|---|
| 4,332,495 | 6/1982 | Bürgers | 403/6 |
| 4,408,923 | 10/1983 | Kubler | 403/407.1 X |
| 4,518,278 | 5/1985 | Koch | 403/230 |
| 4,545,698 | 10/1985 | Koch | 403/231 |
| 4,756,637 | 7/1988 | Walz | 403/231 |
| 4,830,531 | 5/1989 | Condit et al. | 403/405.1 X |
| 4,883,383 | 11/1989 | Challis | 403/407.1 |
| 4,957,386 | 9/1990 | Harley et al. | 403/407.1 X |
| 5,143,473 | 9/1992 | Harley | 403/231 |

FOREIGN PATENT DOCUMENTS

| | | | |
|---|---|---|---|
| 1467282 | 12/1966 | France | 403/405.1 |
| 2546749 | 4/1977 | Germany. | |
| 794608 | 5/1958 | United Kingdom. | |
| 1009985 | 11/1965 | United Kingdom. | |
| 1174319 | 12/1969 | United Kingdom. | |
| 1571697 | 7/1980 | United Kingdom. | |
| 1573172 | 8/1980 | United Kingdom. | |
| 2040385 | 8/1980 | United Kingdom. | |
| 1582761 | 1/1981 | United Kingdom. | |
| 2074282 | 10/1981 | United Kingdom. | |
| 2119052 | 11/1983 | United Kingdom. | |
| 2119053 | 11/1983 | United Kingdom. | |
| 2172076 | 9/1986 | United Kingdom. | |
| 2241299 | 8/1991 | United Kingdom. | |
| 2246826 | 2/1992 | United Kingdom. | |
| 2277973 | 11/1994 | United Kingdom. | |
| 2285106 | 6/1995 | United Kingdom. | |

*Primary Examiner*—Anthony Knight
*Attorney, Agent, or Firm*—Emch, Schaffer, Schaub & Porcello Co., L.P.A.

[57] ABSTRACT

An elongate fastening element for a device for use in forming a joint between two members having at least one engaging surface cooperably engageable with a respective arcuate camming surface of a rotatable tightening element. In use, the fastening element is fitted to one of the joint members and the tightening element is fitted to the other joint member. Rotation of the tightening element about its axis of rotation causes axial movement of the fastening element towards that axis of rotation to cause a joint formed between the two members by means of the device to tighten. The or each engaging surface is provided on a leading end portion of the fastening element and has a profile configured such that engagement with the respective camming surface is at least a line contact occurring over substantially the entire length of the engaging surface.

17 Claims, 4 Drawing Sheets

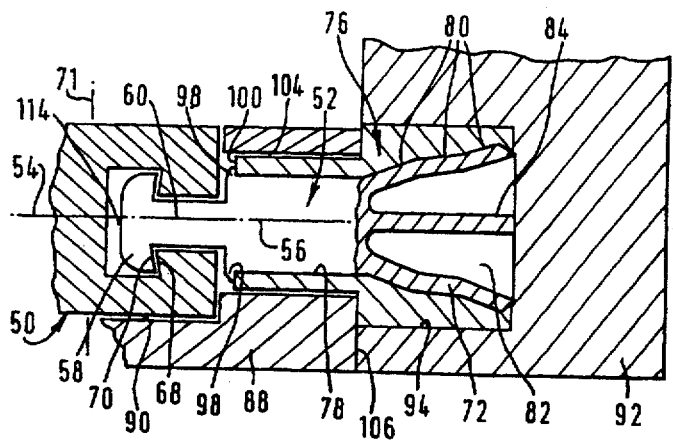

UNITED STATES PATENT AND TRADEMARK OFFICE
CERTIFICATE OF CORRECTION

PATENT NO. : 5,906,453
DATED : May 25, 1999
INVENTOR(S) : Jerry D. Grieser et al.

It is certified that error appears in the above-indentified patent and that said Letters Patent is hereby corrected as shown below:

Fig. 1 should appear as follows:

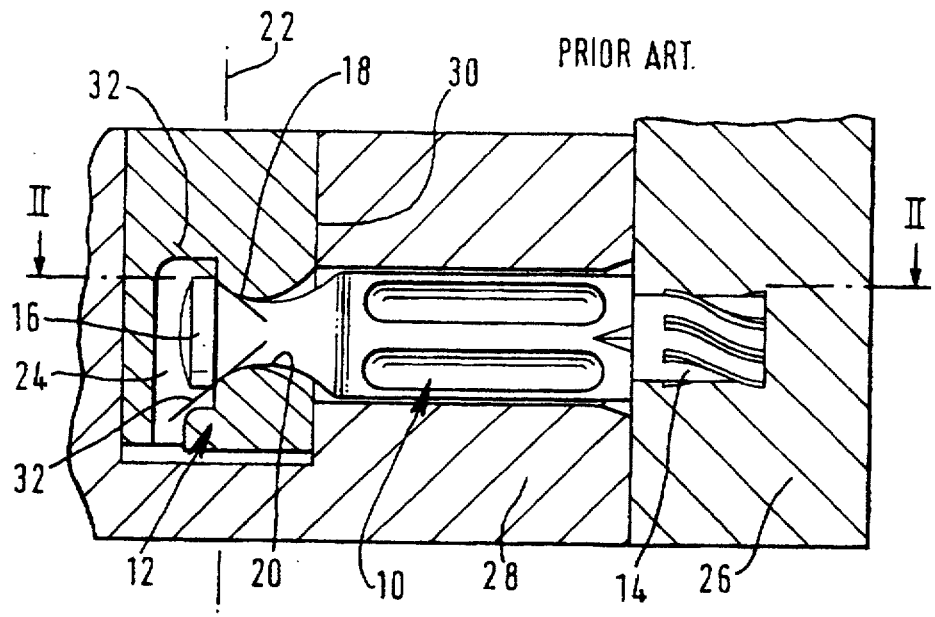

FIG. 1.

UNITED STATES PATENT AND TRADEMARK OFFICE
CERTIFICATE OF CORRECTION

PATENT NO. : 5,906,453
DATED : May 25, 1999
INVENTOR(S) : Jerry D. Grieser et al.

It is certified that error appears in the above-indentified patent and that said Letters Patent is hereby corrected as shown below:

Fig. 2 should appear as follows:

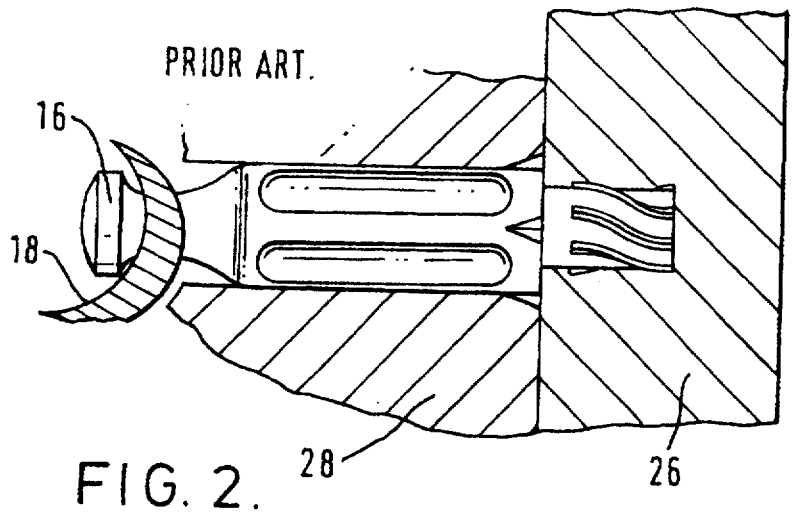

FIG. 2.

UNITED STATES PATENT AND TRADEMARK OFFICE
CERTIFICATE OF CORRECTION

PATENT NO. : 5,906,453
DATED : May 25, 1999
INVENTOR(S) : Jerry D. Grieser et al.

It is certified that error appears in the above-indentified patent and that said Letters Patent is hereby corrected as shown below:

Fig. 3 should appear as follows:

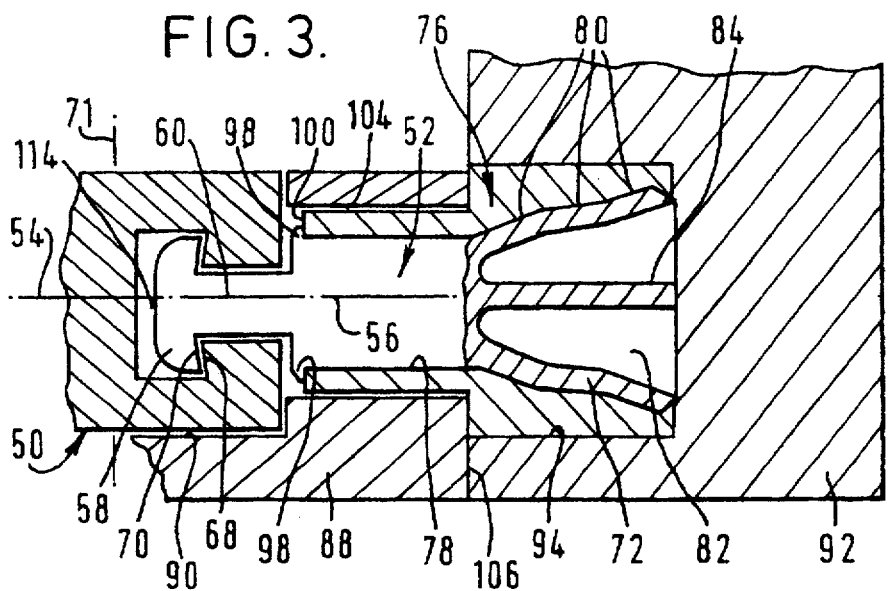

UNITED STATES PATENT AND TRADEMARK OFFICE
CERTIFICATE OF CORRECTION

PATENT NO. : 5,906,453
DATED : May 25, 1999
INVENTOR(S) : Jerry D. Grieser et al.

Page 6 of 7

It is certified that error appears in the above-indentified patent and that said Letters Patent is hereby corrected as shown below:

Fig. 10 should appear as follows:

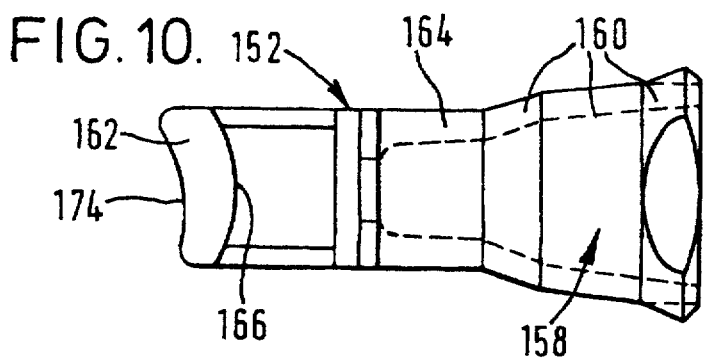

UNITED STATES PATENT AND TRADEMARK OFFICE
CERTIFICATE OF CORRECTION

PATENT NO. : 5,906,453
DATED : May 25, 1999
INVENTOR(S) : Jerry D. Grieser et al.

It is certified that error appears in the above-indentified patent and that said Letters Patent is hereby corrected as shown below:

Fig. 11 should appear as follows: